(12) United States Patent
Hancock et al.

(10) Patent No.: US 8,059,362 B2
(45) Date of Patent: Nov. 15, 2011

(54) POSITIONING A COARSE ACTUATOR OF COMPOUND ACTUATOR TAPE SERVO SYSTEM AT MIDPOINT OF MAXIMUM PEAKS OF LATERAL TAPE MOVEMENT

(75) Inventors: Reed Alan Hancock, Tucson, AZ (US);
Randy Clark Inch, Tucson, AZ (US);
Kevin Bruce Judd, Tucson, AZ (US);
Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/716,067

(22) Filed: Mar. 2, 2010

(65) Prior Publication Data
US 2011/0216440 A1   Sep. 8, 2011

(51) Int. Cl.
*G11B 5/584* (2006.01)
(52) U.S. Cl. .......................................... 360/77.12
(58) Field of Classification Search ................ None
See application file for complete search history.

(56) References Cited

U.S. PATENT DOCUMENTS

| | | | | |
|---|---|---|---|---|
| 5,343,341 A * | 8/1994 | Jahren | .......... | 360/77.12 |
| 5,379,170 A | 1/1995 | Schwarz | .......... | 360/109 |
| 5,661,616 A * | 8/1997 | Tran et al. | .......... | 360/77.12 |
| 5,901,008 A | 5/1999 | Nayak et al. | .......... | 360/78.02 |
| 6,580,581 B1 | 6/2003 | Bui et al. | .......... | 360/78.02 |
| 6,587,303 B1 | 7/2003 | Bui et al. | .......... | 360/78.12 |
| 6,768,608 B2 * | 7/2004 | Saliba et al. | .......... | 360/77.03 |
| 6,801,383 B2 * | 10/2004 | Zweighaft et al. | .......... | 360/77.12 |
| 6,963,467 B2 | 11/2005 | Bui et al. | .......... | 360/78.12 |
| 7,102,845 B2 * | 9/2006 | Saliba et al. | .......... | 360/77.12 |
| 7,110,210 B2 * | 9/2006 | Saliba et al. | .......... | 360/77.12 |
| 7,706,101 B2 * | 4/2010 | Vanderheyden | .......... | 360/78.12 |
| 2002/0181143 A1 | 12/2002 | Winarski et al. | | |
| 2003/0016467 A1 | 1/2003 | Bui et al. | | |
| 2007/0058298 A1 | 3/2007 | Harper et al. | | |

OTHER PUBLICATIONS

U.S. Appl. No. 12/612,403, filed Nov. 4, 2009, Argumedo et al.

* cited by examiner

*Primary Examiner* — Joseph Feild
*Assistant Examiner* — James L Habermehl
(74) *Attorney, Agent, or Firm* — John H. Holcombe

(57) ABSTRACT

Where a tape is subject to lateral shift excursions from one side of a head to another, a coarse actuator is positioned laterally to enable a fine actuator to follow lateral motion of a longitudinal tape having at least one longitudinal defined servo track. A position error signal loop is configured to sense servo sensor(s) and to determine position error between the head and a desired position related to the defined servo track (s). A servo control senses the lateral shift excursion of the defined servo track(s); determines a maximum positive peak and a maximum negative peak of the lateral shift excursion; and positions the coarse actuator substantially at a midpoint of the maximum positive peak and the maximum negative peak of lateral shift excursion of the defined servo track(s). Thus, the fine actuator follows the lateral shift excursion, while the coarse actuator remains at the midpoint.

25 Claims, 6 Drawing Sheets

POSITIONING A COARSE ACTUATOR OF COMPOUND ACTUATOR TAPE SERVO SYSTEM AT MIDPOINT OF MAXIMUM PEAKS OF LATERAL TAPE MOVEMENT

DOCUMENT INCORPORATED BY REFERENCE

Commonly assigned U.S. patent application Ser. No. 12/612,403, Filed Nov. 4, 2009, is incorporated for its showing of a tape servo system for positioning a coarse servo actuator to allow a fine servo actuator to follow tape shift excursions.

FIELD OF THE INVENTION

This invention relates to servo systems for longitudinal tape driven in a longitudinal direction, and more particularly to track following servo systems for following longitudinal servo tracks defined on the longitudinal tape as the tape shifts in a lateral direction.

BACKGROUND OF THE INVENTION

The function of a track following servo system for longitudinal tape, such as magnetic tape, is to move a head laterally of the longitudinal tape to accurately follow the lateral movement of the tape, for example, during read/write operations of the head. If done accurately, the data tracks are written and read in straight lines along the longitudinal tape as the tape is driven in the longitudinal direction. With respect to magnetic tape, the data comprises parallel stripes recorded in the longitudinal direction of the magnetic tape. Servo tracks are prerecorded in the magnetic tape parallel to, and offset from, the expected data stripes. Typically, the lateral movement of the magnetic tape is constrained by flanges present on tape guides at either side of the head, such that the servo system causes the head to follow the data stripes in the presence of disturbances mainly created from limited lateral motion of the tape, called LTM (Lateral Tape Motion).

Servo systems often employ compound actuators to move the head laterally both for track following, and to shift from one servo track (or set of servo tracks) to another and to follow a different set of data stripes. A compound actuator, which comprises a coarse actuator and a fine actuator mounted on the coarse actuator, provides both a large working dynamic range and high bandwidth. The high bandwidth fine actuator typically has a limited range of travel to attain the high bandwidth, and, in the typical track following arrangement, with the fine actuator as the master and the coarse actuator as a slave to the movement of the fine actuator, if the fine actuator drifts to one side as the tape moves laterally, the coarse actuator follows (at a slower rate) the centerline of the movement of the fine actuator.

The flanges of the tape guides, such as rollers, limit the lateral motion of the tape, but may tend to flex the tape and to introduce debris accumulation of the flanges that impact the lifetime of the tape and in addition create undesirable dynamic effects.

Flangeless tape guides tend to solve the problems of the flanged tape guides, but, without being constrained, the longitudinal tape tends to rapidly shift from one side of the path to the other, and may run at one side of the path for only a short period. Thus, in an attempt to follow the tape from one side to the other, the coarse actuator, in following the centerline of the movement of the fine actuator, is required to move at its highest rate from side to side as the tape rapidly shifts. This motion tends to wear and shorten the life of the coarse actuator, and is a use of power by the coarse actuator.

The incorporated '403 application centers the coarse actuator at the midpoint of the lateral shift excursions rather than attempting to follow the fine actuator. Thus, the fine actuator follows the lateral shift excursion, while the coarse actuator remains at the midpoint.

SUMMARY OF THE INVENTION

Methods, servo systems, data storage drives, and computer program products are provided for positioning a head laterally to enable following lateral motion of a longitudinal tape having at least one longitudinal defined servo track. The servo system comprises at least one servo sensor configured to sense lateral position of the head with respect to defined servo tracks, a fine actuator configured to translate the head laterally with respect to the longitudinal tape, a coarse actuator configured to translate the fine actuator laterally with respect to the longitudinal tape, and a position error signal loop configured to sense the servo sensor(s), to determine position error between the head and a desired position related to the defined servo track(s), and to operate the fine actuator to translate the head laterally in a manner to reduce the determined position error.

In one embodiment, a method comprises sensing from the position error signal loop, lateral shift excursion of the defined servo track(s); determining a maximum positive peak and a maximum negative peak of the lateral shift excursion; and operating the coarse actuator to position the coarse actuator substantially at a midpoint of the maximum positive peak and the maximum negative peak of the lateral shift excursion of the defined servo track(s).

In a further embodiment, wherein the longitudinal tape comprises a plurality of defined servo tracks and a plurality of data bands, each positioned between two defined servo tracks; the midpoint is theoretical such that the coarse actuator is operated to position the coarse actuator at an offset from the theoretical midpoint equal to the offset of a desired data band from the theoretical midpoint.

In a still further embodiment, the determined maximum positive peak is updated only by a peak exceeding a previous maximum positive peak; and the determined maximum negative peak is updated only by a peak exceeding a previous maximum negative peak.

In another embodiment, the determination whether a peak is a maximum peak is conducted only if the peak follows a zero crossing of the lateral shift excursion.

In still another embodiment, the step of determining a maximum positive peak and a maximum negative peak of the lateral shift excursion is conducted separately for each longitudinal direction of motion of the longitudinal tape.

Yet another embodiment additionally comprises a preliminary step of sensing the position error signal loop and determining that the position error signal loop is track following the defined servo track(s) within a predetermined position error threshold.

In another embodiment, the step of sensing the position error signal loop comprises sensing an integration function of the loop.

In a further embodiment, the step of sensing the position error signal loop additionally comprises a preliminary step of determining that the integration function amplitude is less than a predetermined threshold.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
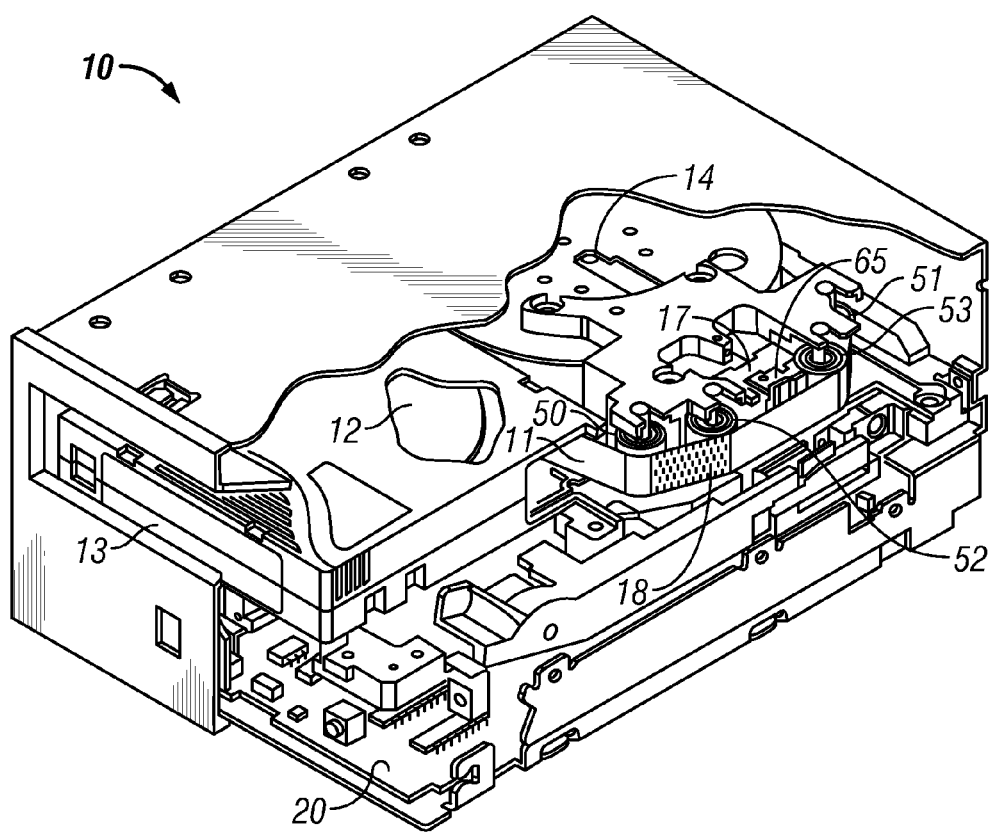
FIG. 1 is a partially cut away view of an exemplary magnetic tape data storage drive which may implement the present invention.
Figure 2:
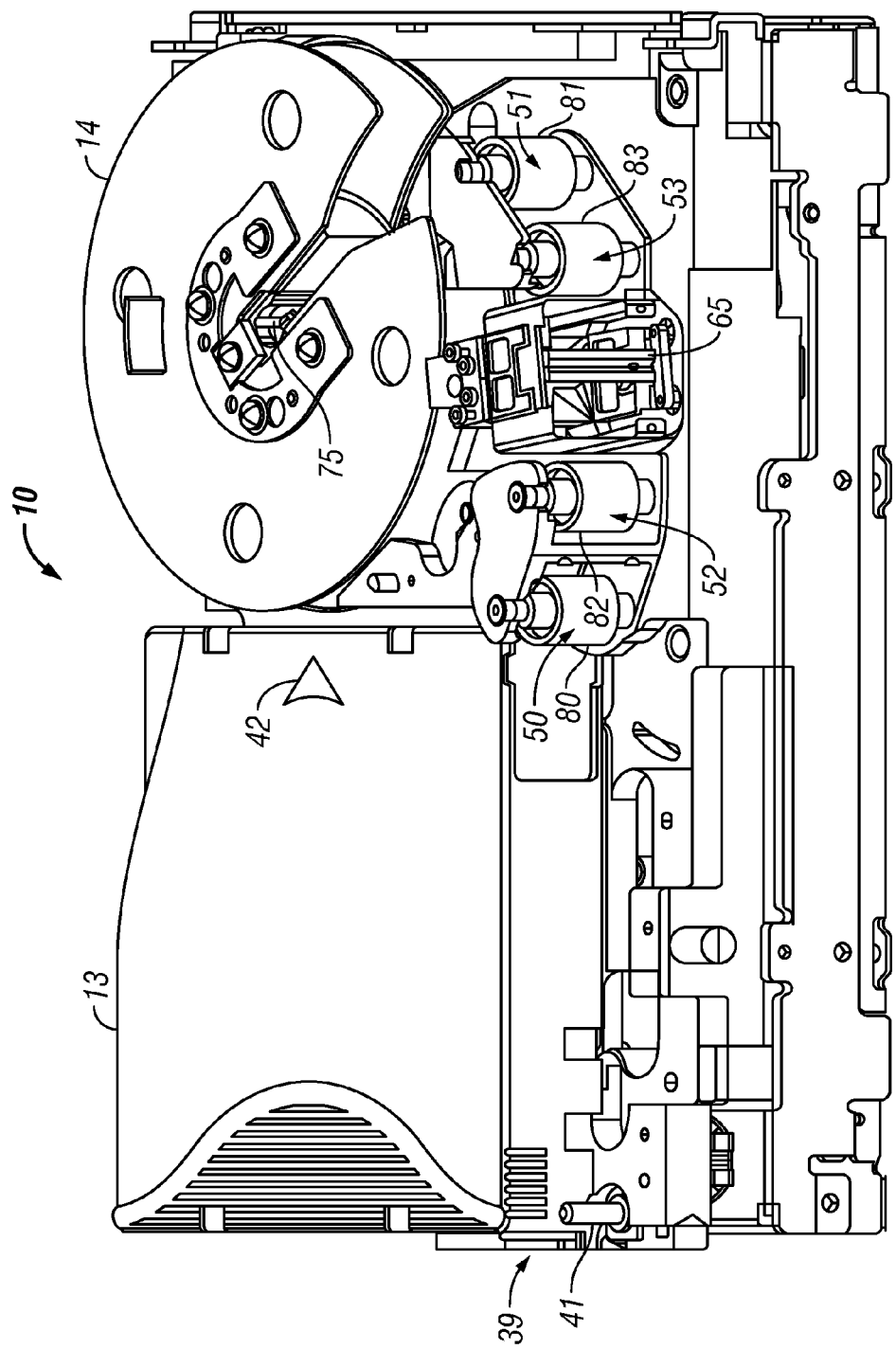
FIG. 2 is a view of the data storage drive of FIG. 1 with the cover removed.

FIGS. 1 and 2 illustrate a magnetic tape data storage drive 10 which writes data 18 to and reads data from longitudinal tape comprising magnetic tape data storage media 11. As is understood by those of skill in the art, magnetic tape data storage drives, also called magnetic tape drives or tape drives, may take any of various forms. The illustrated magnetic tape drive 10 moves the magnetic tape 11 along a tape path in the longitudinal direction of the tape from a supply reel 12 in a magnetic tape data storage cartridge 13 to a take up reel 14. An example of a magnetic tape drive is the IBM® LTO (Linear Tape Open) magnetic tape drive. Another example of a magnetic tape drive is the IBM® TotalStorage Enterprise magnetic tape drive. Both the above examples of magnetic tape drives employ single reel tape cartridges 13. An alternative magnetic tape drive and magnetic tape cartridge is a dual reel cartridge and drive in which both reels 12 and 14 are contained in the cartridge.

The magnetic tape media 11 is moved in the longitudinal direction across a tape head 65. The tape head may be supported and laterally moved by a compound actuator 17 of a track following servo system. The magnetic tape media is supported by roller tape guides 50, 51, 52, 53, which are flangeless, while the magnetic tape media is moved longitudinally.

A typical magnetic tape data storage drive operates in both the forward and reverse directions to read and write data. Thus, the magnetic tape head 65 may comprise one set of read and write elements for operating in the forward direction and another set for operating in the reverse direction, or alternatively, may have two sets of the read elements on either side of the write elements to allow the same write elements to write in both directions while the two sets of read elements allow a read-after-write in both directions.

The magnetic tape data storage drive 10 comprises one or more controls 20 for operating the magnetic tape data storage drive in accordance with commands received from an external system. The external system may comprise a network, a host system, a data storage library or automation system, a data storage subsystem, etc., as is known to those of skill in the art. A control typically comprises logic and/or one or more microprocessors with a memory for storing information and program information for operating the microprocessor(s) and drive. The program information may be supplied to the control memory via an input to the control 20 such as a floppy or optical disk, or by reading from a magnetic tape cartridge, or by any other suitable means. The magnetic tape data storage drive 10 may comprise a standalone unit or comprise a part of a tape library or other subsystem, which may comprise the external system. The control 20 also provides the data flow and formatter for data to be read from and written to the magnetic tape media, as is known to those of skill in the art.

A cartridge receiver 39 is configured to receive a magnetic tape cartridge 13 oriented in a single direction, and to align the magnetic tape cartridge, for example, with guide pin 41, with respect to the cartridge receiver. The proper orientation may be illustrated on the cartridge itself, for example, by arrow 42 on the cartridge. The proper orientation may be enforced by the specific shape of the cartridge or by means of various notches that interact with the receiver, as is known to those of skill in the art. The orientation of the magnetic tape cartridge is such that the magnetic tape 11 exits the cartridge at a specified point of the cartridge receiver. A tape threading mechanism may move the free end of the magnetic tape 11 from the magnetic tape cartridge 13 to a take up reel 14, for example, positioning the free end leader block at the central axis 75 of the take up reel. The magnetic tape is thus positioned along the tape path.

In the illustrated embodiment, flangeless tape guide rollers 50, 51, 52 and 53 each has a cylindrical surface 80, 81, 82, 83 oriented to provide a tape path for the magnetic tape 11 across the magnetic tape head 65.

The tape path comprises at least one flangeless tape guide roller 50 positioned between the magnetic tape cartridge 13 and magnetic tape head 65, and may comprise at least one flangeless tape guide roller 50, 51 at either side of the magnetic tape head 65. Additional tape guide rollers or other types of guides may be provided depending on the length and/or complexity of the tape path, and preferably comprise flangeless tape guide rollers, such as tape guide rollers 52 and 53.

Figure 3:
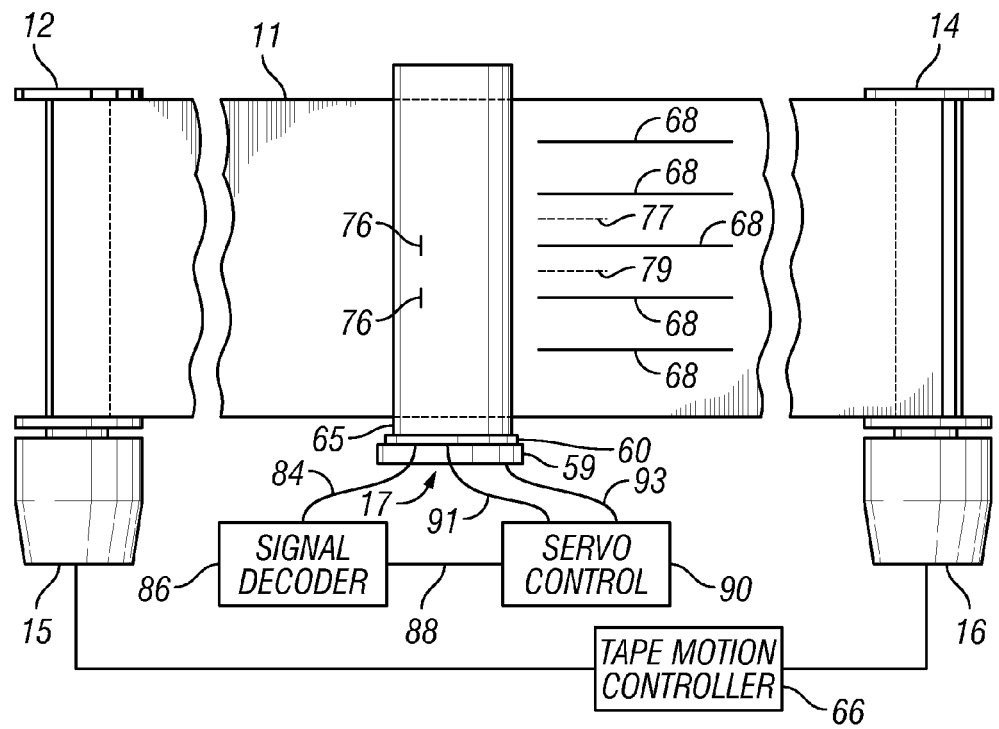
FIG. 3 is a diagrammatic view of the longitudinal tape, tape head and servo system of FIG. 1.

Referring to FIG. 3, as is known to those of skill in the art, flangeless tape guides, such as rollers 50, 51, 52 and 53 of FIG. 2, tend to solve the problems of flanged tape guides, but, as the longitudinal tape 11 is moved longitudinally across the magnetic tape head 65, without being constrained, the tape tends to rapidly shift from one side of the tape head to the other, and to run at one side of the tape head for only a short period.

Still referring to FIG. 3, the longitudinal tape 11 is moved across the tape head 65 between reels 12 and 14 (the tape guide rollers are not shown) by reel motors 15 and 16 under the control of a tape motion controller 66 of control 20 of FIG. 1. The reel motors are operated at various speeds as controlled by the tape motion controller to insure that the magnetic tape media leaves one reel at the same speed that it is wound onto the other reel. The tape motion controller also controls the torque applied to each drive motor 15 and 16 to control the tension applied to the magnetic tape media at the tape head 65.

The magnetic tape head 65 comprises at least one servo read head or sensor 76 that senses a servo pattern recorded in at least one servo track 68 of the tape 11. The servo tracks 68 may comprise a number of parallel servo tracks at various positions across the tape 11, and the servo sensors 76, in one example, comprise a plurality of servo read sensors that are separated by the same distance that separates two servo tracks. As is understood by those of skill in the art, the servo tracks typically extend in the longitudinal direction the full length of the tape, and are prerecorded and defined as a part of the manufacturing process of the tape cartridge 13. Data heads, which may comprise several data read/write transducers are positioned over data track regions of the tape, for example, containing a plurality of parallel data tracks. As is understood by those of skill in the art, typically, the defined servo tracks of magnetic tape systems are parallel to and offset from the data tracks, for example, forming data bands between the servo tracks 68. Although the servo tracks are illustrated as a single line, representing the centerline of the tracks, in one example, the servo tracks are wide enough to allow a single servo track or set of servo tracks to allow serving of various sets of data tracks in the data band by offsetting the servo head from the centerline.

As the tape 11 is moved longitudinally along the tape path, the servo read head(s) 76 read the servo signals which are provided on a servo signal line(s) 84 to a servo decoder 86. The servo decoder processes the received servo signals and generates a position signal that is provided on a position signal line 88 to a servo control 90. Servo control 90 comprises some of the functions of control 20 of FIG. 1. In FIG. 3, the servo control 90 responds to seek signals to cause the compound actuator 17 to move between servo tracks, and responds to the position signals to cause the actuator 17 to follow the desired servo track.

As discussed above, as the longitudinal tape 11 is moved longitudinally across the magnetic tape head 65, the tape tends to rapidly shift from one side of the tape head to the other, and to run at one side of the tape head for only a short period. The shifting of the tape 11 results in shifting a servo track 68 in the lateral direction, illustrated in FIG. 3 as shifting between lateral shift extreme 77 and lateral shift extreme 79, comprising lateral shift excursions between the extremes.

Figure 4:
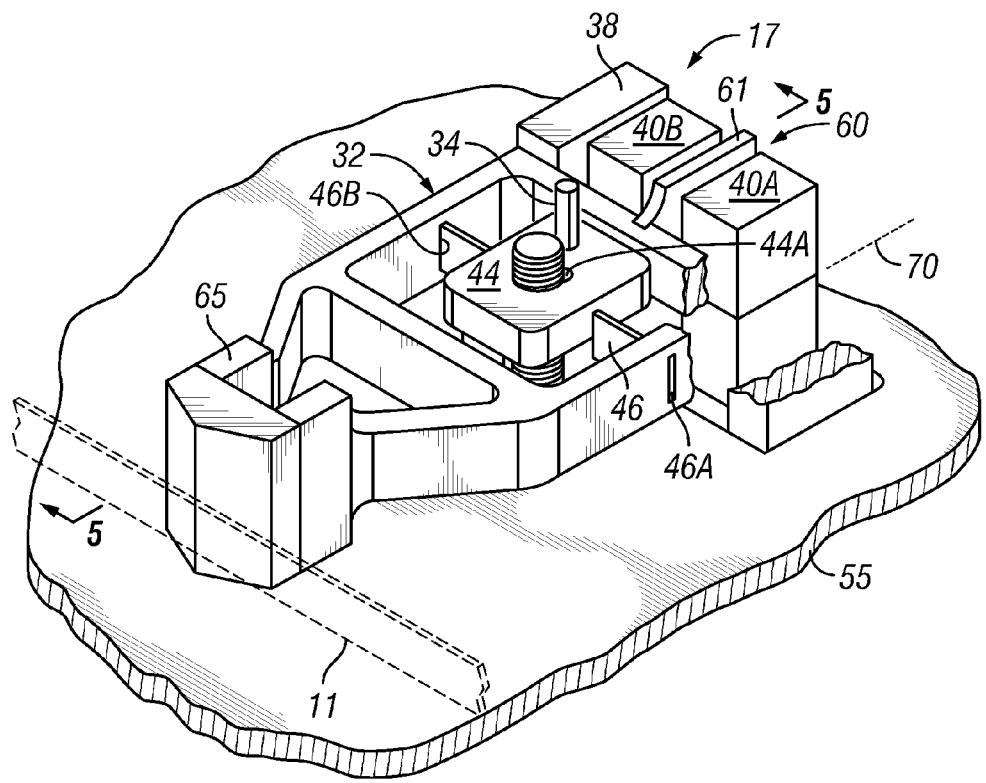
FIG. 4 is a view of a magnetic tape head and compound actuator of the data storage drive of FIG. 1.
Figure 5:
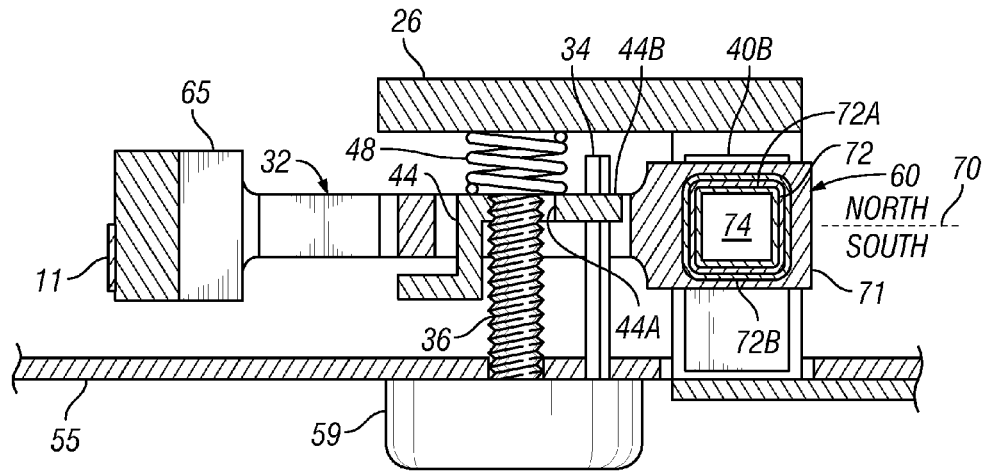
FIG. 5 is a partially cut away side view of the magnetic tape head and compound actuator of FIG. 4.

Referring to FIGS. 3, 4 and 5, an embodiment of the compound actuator 17 is illustrated. The actuator 17 comprises an actuator arm 32 mounting the magnetic tape head 65. A coarse actuator motor 59 drives a lead screw 36 to move fine actuator stage 44 at an aperture 44A in a vertical direction perpendicular to a base 55. An aperture 44B is provided to receive an anti-rotation pin 34, and a load spring 48 is provided between a housing 26 and the stage 44. A torsion spring 46 is fixed to the stage 44 and is coupled at its ends 46A and 46B to the actuator arm 32 so that the stage 44 moves the head 65 mounted on the actuator arm 32 in a vertical direction across the tape.

A fine actuator coil assembly 60 is attached to an end of the actuator arm 32. The coil assembly 60 comprises a coil frame 71, a coil 72, and a mandrel 74. The coil 62 has an upper portion 72A and a lower portion 72B, and is disposed between magnets 40A and 40B held in a magnet housing 38 which are arranged to split the north and south poles at approximately the line 70. The coil moves vertically upon application of a current at the coil 72 and causes the actuator arm 32 to pivot about torsion spring 46 and move the tape head 65 transversely of the tape 11 to make small adjustments such as in track following mode.

The servo control 90 responds to the position signals to generate servo control signals on line 91 to operate the fine actuator 60 to follow the desired servo track, and when the fine actuator movement is insufficient to accommodate the full move, or a large move is required for other purposes, the servo control 90 generates servo control signals on line 93 to cause the coarse actuator 59 to move the fine actuator in the desired direction.

Alternative compound actuators are known to those of skill in the art, all having both a fine actuator providing high bandwidth, but with a limited range of travel, and a coarse actuator providing a large working dynamic range.

Figure 6:
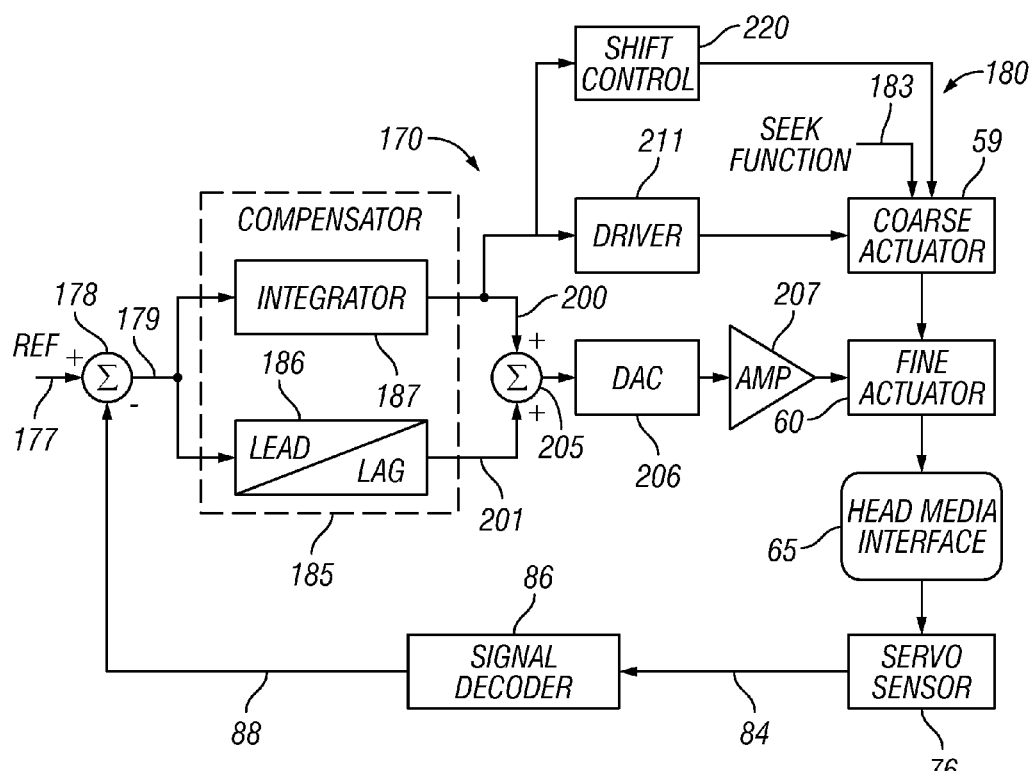
FIG. 6 is block diagram of an embodiment of the servo system of FIG. 3.

An embodiment of a servo control 90 is illustrated in FIG. 6 as part of a position error signal loop 170 of a servo system 180. The normal operation of the servo system after being initialized is discussed in the incorporated '403 application. Briefly, the servo signals are sensed by servo sensor 76 of head 65, and the position of the servo sensor relative to a servo track is detected from the servo signals by the signal decoder 86. The detected position signals are provided on line 88 and preferably comprise digital signals. The position signals are then compared to a reference signal 177 by a comparator 178 to determine position error between the read and a desired position related to the defined servo tracks, called the position error signal, or "PES", on line 179.

The fine actuator servo typically has a compensator function 185 in the position error signal loop, which is designed to enable maximum bandwidth with adequate stability margins. The compensator function 185 modifies the PES signal by applying a variable gain to the PES signal, which gain is based upon the frequency of the input PES signal 179, or, from another viewpoint, upon the rates of change of the input PES signal.

The compensator function 185 includes an integrator function 187 and other transfer function elements, such as a lead/lag functional element 186, to achieve the desired static and dynamic system performance and overall stability. Each element may be implemented as a filter, either an analog filter employing discrete components, or a digital filter, such as an IIR (infinite impulse response) or as a FIR (finite impulse response), or as microcode causing a microprocessor to perform the function.

The integrator function 187 provides a response 200 that generally reduces the gain as the frequency increases. It also can function as a summation of several samples of the signal being integrated. The lead/lag element 186 provides a response 201 which is enhanced or diminished at certain frequency ranges. The combined response 205 provides a servo signal to the fine actuator 60 that has both high bandwidth and stability, as is understood by those of skill in the art. A digital to analog converter 206 and power amplifier 207 apply the signal to the fine actuator 60.

The integrator function 187 integrates the present signal, approximating the current and therefore the force applied to the fine actuator, with prior signals to determine the DC component of the fine actuator PES. If the fine actuator is mounted on springs, then the integrator function represents the position of the fine actuator. An alternative integration function comprises determining the DC component of the drive current for the fine actuator.

The integrator function output 200 thus closely approximates the actual lateral tape motion (LTM).

Where the coarse actuator follows the PES, the integration function output signal on connection 200 provides an integration control signal to a driver 211, which drives the coarse actuator 59, operating the coarse actuator to translate the fine actuator.

If the coarse actuator is a stepper motor, the driver 211 is preferably digital up-down logic and a stepper driver. A step of the stepper motor may result in a linear translation of the fine actuator, for example, of 3 microns. Alternatively, if the coarse actuator is analog, the driver 211 may convert the digital signal to analog and employ a power amplifier to operate the coarse actuator 59.

The coarse actuator may also be operated by a seek function 183 which moves the coarse actuator from one servo track or set of servo tracks to another, or moves the coarse actuator between sets of data tracks within a data band by adjusting the position of the head within a servo track or set of servo tracks.

The output 200 of the integrator is also supplied to a shift control 220 in accordance with the present invention which moves the coarse actuator to a specific location and maintains it at that location.

Referring to FIGS. 3, 6, 7 and 8, as discussed above, flangeless tape guides 50, 51, 52 and 53 of FIG. 2 tend to solve the problems of the flanged tape guides, but, without being constrained, the longitudinal tape 11 tends to rapidly shift from one side of the path to the other, and may run at one side of the path for only a short period. The motion may exceed the range in one direction of the fine actuator 60 and cause the coarse actuator to constantly move to reduce the excursion of the fine actuator. Thus, in an attempt to follow the tape from one side to the other, the coarse actuator 59, in following the movement of the fine actuator 60, is required to move from side to side as the tape rapidly shifts. This motion tends to wear and shorten the life of the coarse actuator, and is a use of power by the coarse actuator. Further, the response is slow compared to the tape shift.

The incorporated '403 application solves this problem by centering the coarse actuator at the midpoint of the lateral shift excursions rather than attempting to follow the fine actuator. Thus, the fine actuator follows the lateral shift excursion, while the coarse actuator remains at the midpoint.

The present invention determines a midpoint for the coarse actuator by determining the maximum positive peak and a maximum negative peak of the lateral shift excursion; and operating the coarse actuator to position the coarse actuator substantially at a midpoint of the maximum positive peak and the maximum negative peak of the lateral shift excursion of the defined servo track(s).

Figure 7:
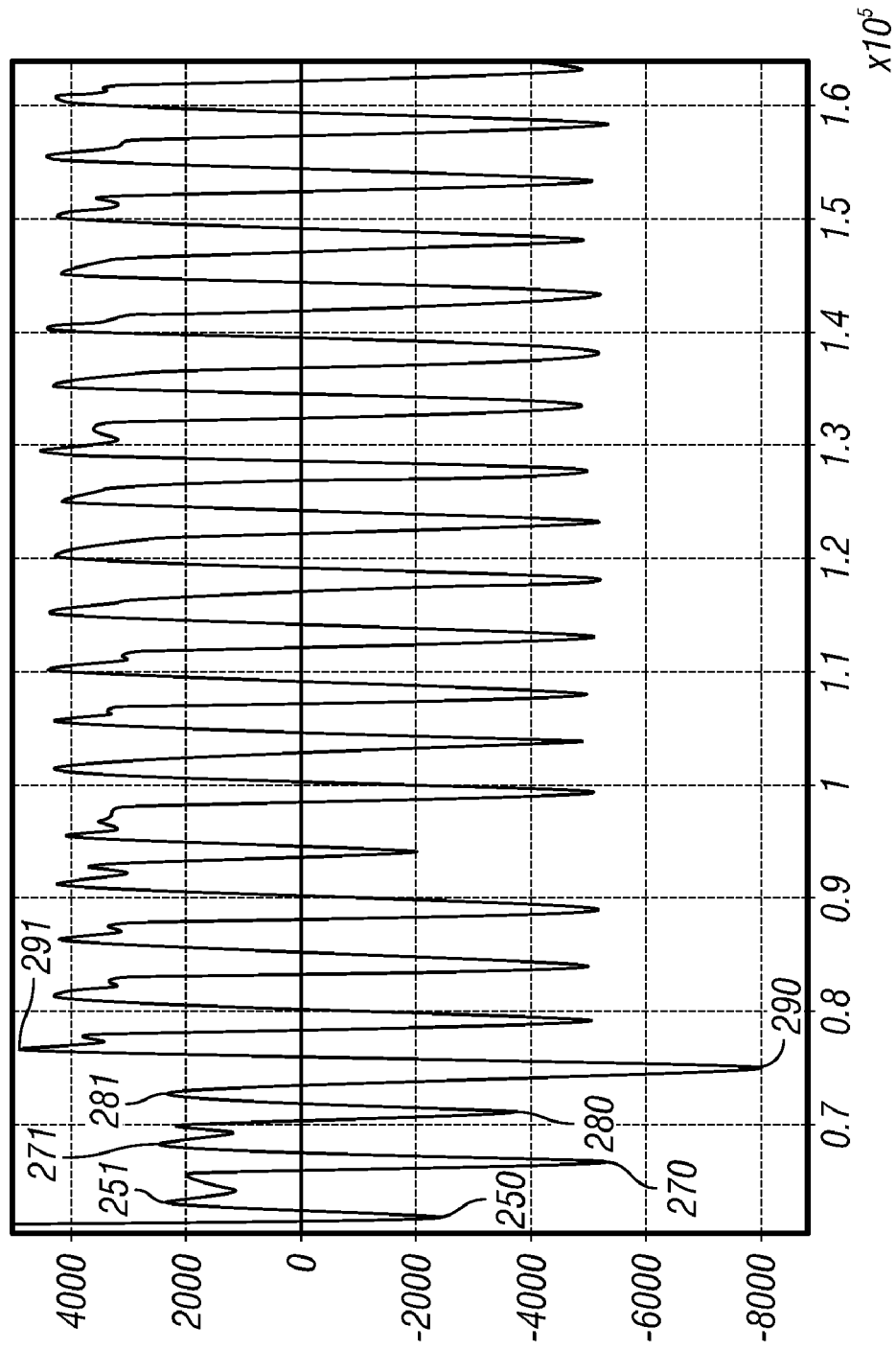
FIG. 7 is an illustration of exemplary signals of an integrator of the servo system of FIG. 6.
Figure 8:
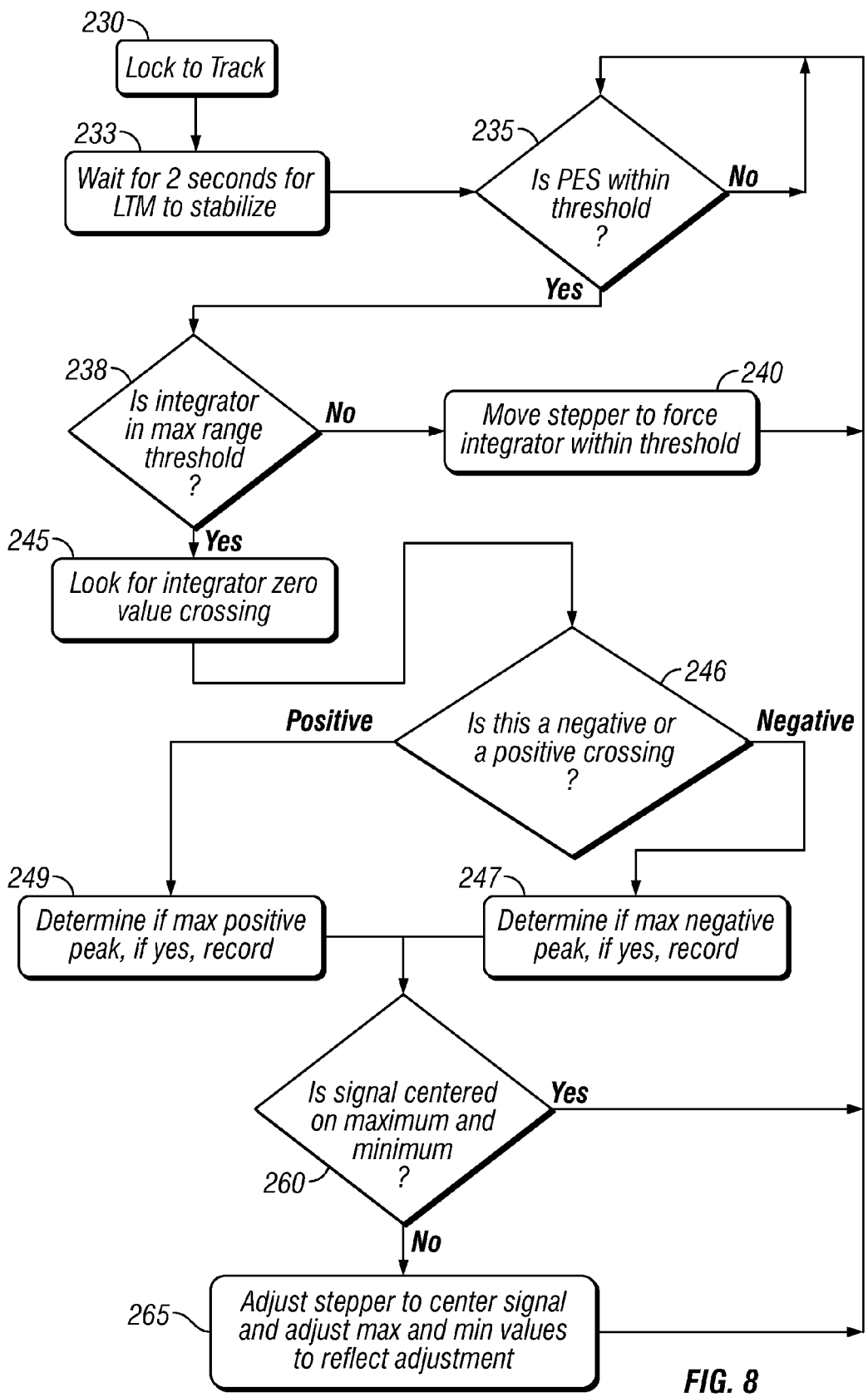
FIG. 8 is a flow chart depicting an embodiment of methods of the present invention.

FIG. 7 illustrates the lateral tape motion of an exemplary magnetic tape 11 at a tape head 65. The illustrated signal may, for example, be that of the integrator function 187. Notice that the tape position tends to be bi-positional, that is, it usually prefers to be in either an up or down position and seldom is in the center of the tape path. The magnitude of the lateral tape motion up or down may be variable. As is known to those of skill in the art, the variations in the magnitude of the tape lateral motion may depend on any of various factors, such as the way that the tape is wound on the reel that it is being unwound from; the reel flanges; the relative angles of the tape cartridge axis, the data storage drive reel, and tape guides within the data storage drive; and the speed or back hitch status of the longitudinal tape movement.

In step 230, the servo sensor(s) 76 lock to a servo track or adjacent servo tracks 68, for example, when a tape is loaded in the data storage drive and brought up to speed. In one example, the servo tracks spanning a centrally located data band are selected for locking to determine the center of the tape path. Step 233 represents a settling time for the tape motion to stabilize. For example, the tape may be in the process of accelerating or decelerating in the longitudinal direction as it is brought up to speed.

In step 235, the signal decoder 86 and servo control conduct a preliminary step of sensing the position error signal loop and determining that the position error signal loop is track following the defined servo track(s) within a predetermined position error threshold. This step is to insure that the servo system is actually track following. In one embodiment, the PES must be 5 μm or less. If the servo system is not track following, the process loops until the track following is functioning.

The center position developed in accordance with the present invention tends to be largely drive related. Hence, the coarse actuator may be initially positioned in the most likely location to be centered. However, there is no assurance that the initial positioning is totally correct. In another preliminary step 238, the PES is fed to the integration function 187, and the shift control 220 determines that the integration function amplitude is less than a predetermined threshold. Thus, if the coarse actuator is positioned incorrectly, such that the fine actuator risks translating beyond its desired range, this will be detected in step 238 and, in step 240, the coarse actuator is moved to force the integrator within the threshold. In this instance, step 240 moves the coarse actuator only if it is at a distant location from the position of the servo track. In one embodiment, the process cycles through the preliminary step 235 again before testing the threshold again in step 238.

The shift control 220 is looking for the maximum positive and negative peaks, and step 245 switches between positive and negative by limiting the determination whether a peak is a maximum peak to only look if the peak follows a zero crossing of the lateral shift excursion. Thus, step 245 waits for an integrator zero value crossing. Step 246 determines, based on the previous sensed peak (whether or not the peak was selected as a maximum peak), or based on the previous zero crossing, whether the present zero crossing detected in step 245 is a negative or a positive zero crossing.

If step 246 determines that a negative zero crossing has occurred, step 247 looks at the integrator signal to determine if the next encountered negative peak 250 is a maximum peak. In the instance depicted in FIG. 7, peak 250 is the first peak encountered and is therefore a maximum peak, and its value is recorded in step 247.

If step 246 then determines that a positive zero crossing has occurred, step 249 looks at the integrator signal to determine if the next encountered positive peak 251 is a maximum peak. Since peak 251 is the first positive peak encountered, it is therefore a maximum peak.

With the detection of both a positive and a negative maximum peak, step 260 determines whether the present signals are centered on the determined maximum and minimum values, the maximum value comprising the maximum positive peak, and the minimum value comprising the maximum negative peak. If not, in step 265, the shift control 220 operates the coarse actuator to move to center the signal, and establishes the maximum and minimum values. The process then returns to step 235.

The process continues for at least a period of time to find the precise maximum positive peak and the maximum negative peak. Specifically, the determined maximum positive peak is updated only by a peak exceeding a previous maximum positive peak; and the determined maximum negative peak is updated only by a peak exceeding a previous maximum negative peak.

For example, at the next negative zero crossing detected in step 246, step 247 determines whether negative peak 270 exceeds the previous maximum negative peak. In the example, the negative peak 270 exceeds the previous maximum negative peak 250. Thus, step 247 updates the maximum negative peak with the value of peak 270, and step 260 determines that the center has shifted due to the new peak. Step 265 adjusts the coarse actuator 59 and adjusts the maximum and minimum values to reflect the adjustment. Next, after detection of a positive zero crossing in step 246, step 249 determines whether positive peak 271 exceeds the previous maximum positive peak 251. In the example, peak 271 exceeds the previous maximum negative peak 251, and step 260 determines that the center has shifted slightly due to the new peak. Step 265 adjusts the coarse actuator 59 and adjusts the maximum and minimum values to reflect the adjustment.

The process repeats, investigating negative peak 280 and positive peak 281. However, neither peak exceeds the previous maximum peak, and is ignored, such that step 260 returns the process to test the next peaks.

For example, at the next negative zero crossing detected in step 246, step 247 determines whether negative peak 290 exceeds the previous maximum negative peak. In the example, the negative peak 290 exceeds the previous maximum negative peak 270. Thus, step 247 updates the maximum negative peak with the value of peak 290, and step 260 determines that the center has shifted due to the new peak. Step 265 adjusts the coarse actuator 59 and adjusts the maximum and minimum values to reflect the adjustment.

At the next positive zero crossing detected in step 246, step 247 determines whether positive peak 291 exceeds the previous maximum positive peak. In the example, the positive peak 291 exceeds the previous maximum positive peak 271. Thus, step 247 updates the maximum positive peak with the value of peak 291, and step 260 determines that the center has shifted due to the new peak. Step 265 adjusts the coarse actuator 59 and adjusts the maximum and minimum values to reflect the adjustment.

In the example, all subsequent negative and positive peaks fail to exceed the previous peaks and are therefore ignored. The center position of the coarse actuator may then be fixed for the magnetic tape for its current direction of movement, for example, by being placed in memory of the shift control processor.

In one embodiment, the step of determining a maximum positive peak and a maximum negative peak of the lateral shift excursion is conducted separately for each longitudinal direction of motion of the tape. Referring to FIG. 1, for example, the reel specifications are much tighter for the reel 14 of the data storage drive than for the reel 12 of the portable data storage cartridge 13. Thus, the resultant lateral tape movement may be different depending on the direction of motion of the tape and which reel the tape is being unwound from.

Referring to FIG. 3, the lateral motion of the fine actuator is limited and provides high bandwidth. The lateral motion, for example, exceeds the lateral excursion from position 77 to position 79 by a definite amount, but is not sufficient to move from one side of the magnetic tape 11 to the other, requiring a repositioning of the coarse actuator if the servo system is to move to another data band and servo sensors 76 track follow another set of servo tracks 68. Thus, where the longitudinal tape comprises a plurality of defined servo tracks and a plurality of data bands, each positioned between two defined servo tracks, the midpoint is theoretical such that the coarse actuator is operated to position the coarse actuator at an offset from the theoretical midpoint equal to the offset of a desired data band from the theoretical midpoint. In the illustrated example, where there are 5 servo tracks, the theoretical midpoint may be the middle of the middle servo track, or alternatively, a position within the servo tracks on either side of a predetermined data band.

The finally determined midpoints for each direction of longitudinal motion of a tape, or averages taken from a number of tapes, may be stored and employed as the initial starting position of the coarse actuator for subsequent tapes.

The implementations may involve software, firmware, micro-code, hardware and/or any combination thereof. The implementation may take the form of code or logic implemented in a medium, such as control 20 or servo control 90 where the medium may comprise hardware logic (e.g. an integrated circuit chip, Programmable Gate Array [PGA], Application Specific Integrated Circuit [ASIC], or other circuit, logic or device), and stored a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk-read only memory [CD-ROM], compact disk-read/write [CD-R/W] and DVD).

Those of skill in the art will understand that changes may be made with respect to the methods discussed above, including changes to the ordering of the steps. Further, those of skill in the art will understand that differing specific component arrangements may be employed than those illustrated herein.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor as discussed above and be stored in a computer readable storage medium as discussed above as a computer program product that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In a servo system for positioning a head laterally to follow lateral motion of a longitudinal tape having at least one longitudinal defined servo track, said servo system comprising at least one servo sensor configured to sense lateral position of said head with respect to defined servo tracks, a fine actuator configured to translate said head laterally with respect to said longitudinal tape, a coarse actuator configured to translate said fine actuator laterally with respect to said longitudinal tape, and a position error signal loop configured to sense said at least one servo sensor, to determine position error between said head and a desired position related to said at least one defined servo track, and to operate said fine actuator to translate said head laterally in a manner to reduce said determined position error, the method comprising:
sensing from said position error signal loop, lateral shift excursion of said at least one defined servo track;
determining a maximum positive peak and a maximum negative peak of said lateral shift excursion; and
operating said coarse actuator to position said coarse actuator substantially at a midpoint of said maximum positive peak and said maximum negative peak of said lateral shift excursion of said at least one defined servo track.

2. The method of claim 1, wherein said longitudinal tape comprises a plurality of said defined servo tracks and a plurality of data bands, each positioned between two said defined servo tracks; and said midpoint is theoretical such that said coarse actuator is operated to position said coarse actuator at an offset from said theoretical midpoint equal to the offset of a desired data band from said theoretical midpoint.

3. The method of claim 1, wherein said determined maximum positive peak is updated only by a peak exceeding a previous maximum positive peak; and said determined maximum negative peak is updated only by a peak exceeding a previous maximum negative peak.

4. The method of claim 3, wherein said determination whether a peak is a maximum peak is conducted only if said peak follows a zero crossing of said lateral shift excursion.

5. The method of claim 3, wherein said step of determining a maximum positive peak and a maximum negative peak of said lateral shift excursion is conducted separately for each longitudinal direction of motion of said longitudinal tape.

6. The method of claim 3, additionally comprising a preliminary step of sensing said position error signal loop and determining that said position error signal loop is track following said at least one defined servo track within a predetermined position error threshold.

7. The method of claim 3, wherein said step of sensing said position error signal loop comprises sensing an integration function of said loop.

8. The method of claim 7, wherein said step of sensing said position error signal loop additionally comprises a preliminary step of determining that said integration function amplitude is less than a predetermined threshold.

9. A servo system configured to position a head laterally with respect to at least one defined servo track of longitudinal tape, comprising:

at least one servo sensor for sensing lateral position of said head with respect to at least one defined servo track of said longitudinal tape;
a fine actuator configured to translate said head laterally with respect to said longitudinal tape;
a coarse actuator configured to translate said fine actuator laterally with respect to said longitudinal tape; and
a servo control configured to sense said at least one servo sensor; to determine position error between said head and a desired position related to said at least one defined servo track; to provide signals to operate said fine actuator to translate said head laterally in a manner to reduce said determined position error; to sense from said position error signals, lateral shift excursion of said at least one defined servo track; to determine a maximum positive peak and a maximum negative peak of said lateral shift excursion; and to operate said coarse actuator to position said coarse actuator substantially at a midpoint of said maximum positive peak and said maximum negative peak of said lateral shift excursion of said at least one defined servo track.

10. The servo system of claim 9, wherein said longitudinal tape comprises a plurality of said defined servo tracks and a plurality of data bands, each positioned between two said defined servo tracks; and said midpoint is theoretical such that said servo control operates said coarse actuator to position said coarse actuator at an offset from said theoretical midpoint equal to the offset of a desired data band from said theoretical midpoint.

11. The servo system of claim 9, wherein said servo control is configured to update said determined maximum positive peak only by a peak exceeding a previous maximum positive peak; and to update said determined maximum negative peak only by a peak exceeding a previous maximum negative peak.

12. The servo system of claim 11, wherein said servo control is configured to determine whether a peak is a maximum peak only if said peak follows a zero crossing of said lateral shift excursion.

13. The servo system of claim 11, wherein said servo control is configured to determine a maximum positive peak and a maximum negative peak of said lateral shift excursion separately for each longitudinal direction of motion of said longitudinal tape.

14. The servo system of claim 11, wherein said servo control is additionally configured to preliminarily sense said position error signals and determine that said servo control is track following said at least one defined servo track within a predetermined position error threshold.

15. The servo system of claim 11, wherein said servo control is configured to provide said sensed said position error signals as an integration function.

16. The servo system of claim 15, wherein said servo control is additionally configured to preliminarily determining that said integration function amplitude is less than a predetermined threshold.

17. A data storage drive comprising:
a head configured to record and read data on a longitudinal tape data storage medium;
a drive configured to move said longitudinal tape data storage medium in the longitudinal direction with respect to said head, said drive comprising at least one flangeless tape guide at either side of said head in said longitudinal direction and configured to position said longitudinal tape data storage medium in proximity with respect to said head; and a servo system configured to position said head laterally with respect to at least one defined servo track of longitudinal tape, comprising:
- a servo sensor for sensing lateral position of said head with respect to at least one defined servo track of said longitudinal tape;
- a fine actuator configured to translate said head laterally with respect to said longitudinal tape;
- a coarse actuator configured to translate said fine actuator laterally with respect to said longitudinal tape; and
- a servo control a servo control configured to sense said at least one servo sensor; to determine position error between said head and a desired position related to said at least one defined servo track; to provide signals to operate said fine actuator to translate said head laterally in a manner to reduce said determined position error; to sense from said position error signals, lateral shift excursion of said at least one defined servo track; to determine a maximum positive peak and a maximum negative peak of said lateral shift excursion; and to operate said coarse actuator to position said coarse actuator substantially at a midpoint of said maximum positive peak and said maximum negative peak of said lateral shift excursion of said at least one defined servo track.

18. The data storage drive of claim 17, wherein said longitudinal tape comprises a plurality of said defined servo tracks and a plurality of data bands, each positioned between two said defined servo tracks; and said midpoint is theoretical such that said servo control operates said coarse actuator to position said coarse actuator at an offset from said theoretical midpoint equal to the offset of a desired data band from said theoretical midpoint.

19. The data storage drive of claim 17, wherein said servo control is configured to update said determined maximum positive peak only by a peak exceeding a previous maximum positive peak; and to update said determined maximum negative peak only by a peak exceeding a previous maximum negative peak.

20. The data storage drive of claim 19, wherein said servo control is configured to determine whether a peak is a maximum peak only if said peak follows a zero crossing of said lateral shift excursion.

21. The data storage drive of claim 19, wherein said servo control is configured to determine a maximum positive peak and a maximum negative peak of said lateral shift excursion separately for each longitudinal direction of motion of said longitudinal tape.

22. The data storage drive of claim 19, wherein said servo control is additionally configured to preliminarily sense said position error signals and determine that said servo control is track following said at least one defined servo track within a predetermined position error threshold.

23. The data storage drive of claim 19, wherein said servo control is configured to provide said sensed said position error signals as an integration function.

24. The data storage drive of claim 23, wherein said servo control is additionally configured to preliminarily determining that said integration function amplitude is less than a predetermined threshold.

25. A computer program product for operating a servo system to position a head laterally to follow lateral motion of a longitudinal tape having at least one longitudinal defined servo track, said servo system comprising at least one servo sensor configured to sense lateral position of said head with respect to defined servo tracks, a fine actuator configured to translate said head laterally with respect to said longitudinal tape, a coarse actuator configured to translate said fine actuator laterally with respect to said longitudinal tape, and a position error signal loop configured to sense said at least one servo sensor, to determine position error between said head and a desired position related to said at least one defined servo track, and to operate said fine actuator to translate said head laterally in a manner to reduce said determined position error, said computer program product comprising a computer readable non-transitory storage medium having computer readable program code, wherein said computer readable program code, when executed on a computer processing system, causes said computer processing system to:
- sense from said position error signal loop, lateral shift excursion of said at least one defined servo track;
- determine a maximum positive peak and a maximum negative peak of said lateral shift excursion, updating said determined maximum positive peak only by a peak exceeding a previous maximum positive peak; and updating said determined maximum negative peak only by a peak exceeding a previous maximum negative peak; and
- operate said coarse actuator to position said coarse actuator substantially at a midpoint of said maximum positive peak and said maximum negative peak of said lateral shift excursion of said at least one defined servo track.

* * * * *